US012235845B2

(12) United States Patent
Sun et al.

(10) Patent No.: US 12,235,845 B2
(45) Date of Patent: Feb. 25, 2025

(54) TUNING APPROXIMATE NEAREST NEIGHBOR SEARCH ENGINES FOR SPEED-RECALL TRADEOFFS VIA LAGRANGE MULTIPLIER METHODS

(71) Applicant: Google LLC, Mountain View, CA (US)

(72) Inventors: Philip Wenjie Sun, New York, NY (US); Ruiqi Guo, Elmhurst, NY (US); Sanjiv Kumar, Jericho, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/474,907

(22) Filed: Sep. 26, 2023

(65) Prior Publication Data

US 2024/0119052 A1    Apr. 11, 2024

Related U.S. Application Data

(60) Provisional application No. 63/410,536, filed on Sep. 27, 2022.

(51) Int. Cl.
*G06F 16/245* (2019.01)
*G06F 16/2453* (2019.01)
*G06F 16/95* (2019.01)
*G06F 16/953* (2019.01)

(52) U.S. Cl.
CPC .. *G06F 16/24545* (2019.01); *G06F 16/24549* (2019.01); *G06F 16/953* (2019.01)

(58) Field of Classification Search
None
See application file for complete search history.

(56) References Cited

U.S. PATENT DOCUMENTS

| | | | |
|---|---|---|---|
| 11,868,380 B1 * | 1/2024 | Pavlopoulou | G06F 16/3329 |
| 2010/0063948 A1 * | 3/2010 | Virkar | G06F 16/953 |
| | | | 707/769 |
| 2019/0108444 A1 * | 4/2019 | Song | G06F 16/245 |
| 2020/0372305 A1 * | 11/2020 | Streeter | G06F 16/245 |
| 2021/0064634 A1 * | 3/2021 | Guo | G06F 16/258 |

OTHER PUBLICATIONS

Acar et al., "Federated Learning Based on Dynamic Regularization.", International Conference on Learning Representations, Virtual Only, May 3-7, 2021, 36 pages.
Agarwal et al., "Federated Residual Learning.", arXiv:2003,12880v1, Mar. 28, 2020, 34 pages.

(Continued)

*Primary Examiner* — Son T Hoang
(74) *Attorney, Agent, or Firm* — DORITY & MANNING P.A.

(57) ABSTRACT

Example quantization-based approximate nearest neighbors (ANN) search methods and systems (e.g., search engines) are tuned to perform at the speed-recall pareto frontier. With a desired search cost or recall as input, embodiments employ Lagrangian-based methods to perform constrained optimization on theoretically-grounded search cost and recall models. The resulting tunings, when paired with the efficient quantization-based ANN implementation of the embodiments, exhibit excellent performance on standard benchmarks while requiring minimal tuning or configuration complexity.

20 Claims, 7 Drawing Sheets

(56) References Cited

OTHER PUBLICATIONS

Andoni et al., "Optimal Data-Dependent Hashing for Approximate Near Neighbors.", Forty-Seventh Annual Association for Computing Machinery Symposium on Theory of Computing, New York, New York, United States, Jan. 7, 2015, 28 pages.
Arivazhagan et al., "Federated Learning with Personalization Layers.", arXiv:1912.00818 v1, Dec. 2, 2019, 13 pages.
Aumüller et al., "Ann-Benchmarks: A Benchmarking Tool for Approximate Nearest Neighbor Algorithms.", arXiv:1807.05614v2, Jul. 17, 2018, 20 pages.
Babenko et al., "Tree Quantization for Large-Scale Similarity Search and Classification.", Institute of Electrical and Electronics Engineers Conference on Computer Vision and Pattern Recognition, Boston, Massachusetts, United States, Jun. 7, 2015, pp. 4240-4248.
Beery et al., "The iWildCam 2020 Competition Dataset.", arXiv:2004.10340v1, Apr. 21, 2020, 4 pages.
Benzi et al., "Song Recommendation with Non-Negative Matrix Factorization and Graph Total Variation.", 2016 Institute of Electrical and Electronics Engineers International Conference on Acoustics, Speech, and Signal Processing (ICASSP), Mar. 20, 2016, Shanghai, China, pp. 1-5.
Bergstra et al., "Algorithms for Hyper-Parameter Optimization.", Advances in Neural Information Processing Systems, vol. 24, 2011, pp. 1-9.
Bhatia et al., "Survey of Nearest Neighbor Techniques.", International Journal of Computer Science and Information Security, vol. 8, No. 7, 2010, pp. 302-305.
Bozkaya et al., "Distance-Based Indexing for High-Dimensional Metric Spaces.", 1997 Association for Computing Machinery SIGMOD International Conference on Management of Data, 1997, New York, New York, United States, pp. 357-368.
Bui et al., "Federated User Representation Learning.", arXiv:1909.12535v1, Sep. 27, 2019, 10 pages.
Caldas et al. "LEAF: A Benchmark for Federated Settings.", arXiv:1812.01097v1, Dec. 3, 2018, 6 pages.
Changpinyo et al., "Synthesized Classifiers for Zero-Shot Learning.", Conference on Computer Vision and Pattern Recognition, Las Vegas, Nevada, United States Jun. 27-30, 2016, pp. 5327-5336.
Chen et al., "Dynamic Convolution: Attention Over Convolution Kernels.", Conference on Computer Vision and Pattern Recognition, Seattle, Washington, United States, Jun. 13-19, 2020, pp. 11030-11039.
Chen et al., "FedBE: Making Bayesian Model Ensemble Applicable to Federated Learning.", International Conference on Learning Representations, Virtual Only, May 3-7, 2021, 21 pages.
Chen et al., "Federated Meta-Learning with Fast Convergence and Efficient Communication." arXiv:1802.07876v1, Feb. 22, 2018, 9 pages.
Chen et al., "On Bridging Generic and Personalized Federated Learning for Image Classification."> International Conference on Learning Representations, Virtual Only Apr. 25-29, 2022, 32 pages.
Chen et al., "Spann: Highly Efficient Billion-Scale Approximate Nearest Neighborhood Search.", Advances in Neural Information Processing Systems, vol. 34, 2021, pp. 1-13.
Cheng et al., "Fine-Tuning is Fine in Federated Learning.", arXiv:2108.07313v1, Aug. 16, 2021, 40 pages.
Collins et al., "Exploiting Shared Representations for Personalized Federated Learning.", International Conference on Machine Learning, Virtual Only, Jul. 18-24, 2021, 11 pages.
Cordts et al., "The Cityscapes Dataset for Semantic Urban Scene Understanding.", Conference on Computer Vision and Pattern Recognition, Las Vegas, Nevada, United States, Jun. 26-Jul. 1, 2016, pp. 3213-3223.
Corinzia et al., "Variational Federated Multi-Task Learning.", arXiv:1906.06268v1, Jun. 14, 2019, 10 pages.
Cremonesi et al, "Performance of Recommender Algorithms on Top-N Recommendation Tasks.", Fourth Association for Computing Machinery Conference on Recommender Systems, Sep. 2010, New York, New York, United States, pp. 2-8.
Criteo, "Autofaiss: Automatically Create Faiss Knn Indices with the Most Optimal Similarity Search Parameters", https://github.com/criteo/autofaiss, retrieved on Feb. 14, 2024, 4 pages.
Cui et al., "Class-Balanced Loss Based on Effective No. of Samples.", International Conference on Computer Vision and Pattern Recognition, Long Beach, California, United States, Jun. 16-20, 2019, pp. 9268-9277.
Datar et al., "Locality-Sensitive Hashing Scheme Based on p-Stable Distributions.", Twentieth Annual Symposium on Computational Geometry, 2004, New York, New York, United States, pp. 253-262.
Deng et al., "Adaptive Personalized Federated Learning.", arXiv:2003.13461v1, Mar. 30, 2020, 34 pages.
Dinh et al., "Personalized Federated Learning with Moreau Envelopes.", Neural Information Processing Systems, Virtual Only, Dec. 6-12, 2020, pp. 21394-21405.
Evgeniou et al., "Multi-Task Feature Learning.", Neural Information Processing Systems, Dec. 3-8, 2007, 8 pages.
Evgeniou et al., "Regularized Multi-Task Learning.", International Conference on Knowledge Discovery and Data Mining, Seattle, Washington, United States, Aug. 22-25, 2004, pp. 109-117.
Fallah et al., "Personalized Federated Learning: A Meta-Learning Approach.", arXiv:2002.07948v4, Oct. 23, 2020, 29 pages.
Fang et al., "Unbiased Metric Learning: On the Utilization of Multiple Datasets and Web Images for Softening Bias.", International Conference on Computer Vision, Sydney, Australia, Dec. 1-8, 2013, pp. 1657-1664.
Fu et al., "Fast Approximate Nearest Neighbor Search with the Navigating Spreading-Out Graph." Proceedings of VLDB Endowment, vol. 12, No. 5, Jan. 2019, pp. 1-21.
Gfeller et al., "Now Playing: Continuous Low-Power Music Recognition.", NIPS 2017 Workshop: Machine Learning on the Phone, Dec. 4-9, 2017, Long Beach, California, United States, pp. 1-5.
Golovin et al. "Google Vizier: A Service for Black-Box Optimization.", Twenty-third Association for Computing Machinery SIGKDD International Conference on Knowledge Discovery and Data Mining, 2017, New York, New York, United States, pp. 1-10.
Guo et al., "Accelerating Large-Scale Inference with Anisotropic Vector Quantization.", Thirty-seventh International Conference on Machine Learning, vol. 119 of Proceedings of Machine Learning Research, Jul. 13-18, 2020, Vienna, Austria, pp. 1-18.
Guu et al., "Realm: Retrieval Augmented Language Model Pre-Training.", Thirty-seventh International Conference on Machine Learning, 2020, pp. 1-12.
Hanzely et al., "Federated Learning of a Mixture of Global and Local Models.", arXiv:2002.05516v2, Feb. 14, 2020, 43 pages.
Hanzely et al., "Lower Bounds and Optimal Algorithms for Personalized Federated Learning.", Neural Information Processing Systems, Virtual Only, Dec. 6-12, 2020, 12 pages.
He et al. "Group Knowledge Transfer: Federated Learning of Large CNNs at the Edge.", Neural Information Processing Systems, Virtual Only, Dec. 6-12, 2020, 13 pages.
He et al., "Deep Residual Learning for Image Recognition.", Conference on Computer Vision and Pattern Recognition, Las Vegas, Nevada, United States, Jun. 26-Jul. 1, 2016, 9 pages.
Hsu et al., "Federated Visual Classification with Real-World Data Distribution.", European Conference on Computer Vision, Amsterdam, The Netherlands, Oct. 1-14, 2020, 16 pages.
Hsu et al., "Measuring the Effects of Non-Identical Data Distribution for Federated Visual Classification", arXiv:1909.06335v1, Feb. 13, 2019, 5 pages.
Huang et al., "Personalized Cross-Silo Federated Learning on Non-Lid Data.", Association for Advancement of Artificial Intelligence, Virtual Only, Feb. 2-9, 2021, 9 pages.
Iwasaki et al., "Optimization of Indexing Based on k-Nearest Neighbor Graph for Proximity Search in High-Dimensional Data.", Computing Research Repository, arXiv:1810.07355, 2018, 12 pages.
Jacob et al., "Clustered Multi-Task Learning: A Convex Formulation.", Neural Information Processing Systems, Vancouver, Canada, Dec. 7-12, 2009, 8 pages.

(56) References Cited

OTHER PUBLICATIONS

Jégou et al., "Product Quantization for Nearest Neighbor Search.", Institute of Electrical and Electronics Engineers Transactions on Pattern Analysis and Machine Intelligence, vol. 33, No. 1, 2011, pp. 1-12.

Jiang et al., "Improving Federated Learning Personalization via Model Agnostic Meta Learning."; arXiv:1909.12488v1, Sep. 27, 2019, 11 pages.

Johnson et al., "Billion-Scale Similarity Search with GPUs.", Institute of Electrical and Electronics Engineers Transactions on Big Data, vol. 7, No. 3, 2021, pp. 1-12.

Jordan et al., "Machine Learning: Trends, Perspectives, and Prospects", Science, vol. 349, Issue 6245, Jul. 17, 2015, pp. 255-260.

Kairouz et al., "Advances and Open Problems in Federated Learning.", arXiv:1912.04977vl, Dec. 10, 2019, 105 pages.

Kang et al., "Decoupling Representation and Classifier for Long-Tailed Recognition." International Conference on Learning Representations, Virtual Only, Apr. 26-May 1, 2020, 14 pages.

Karimireddy et al., "Mimicking Centralized Stochastic Algorithms in Federated Learning", arXiv:2008.03606v1, Aug. 8, 2020, 24 pages.

Khandelwal et al., "Generalization Through Memorization: Nearest Neighbor Language Models.", Conference on Learning Representations, Apr. 26-30, 2020, Addis Ababa, Ethiopia, pp. 1-13.

Khodak et al., Adaptive Gradient-Based Meta-Learning Methods., Conference on Neural Information Processing System, Vancouver, Canada, Dec. 8-14, 2019, 12 pages.

Kingma et al., "Adam: A Method for Stochastic Optimization.", arXiv:1412.6980v5, Apr. 23, 2015, 13 pages.

Kitaev et al., "Reformer: The Efficient Transformer.", Eighth International Conference on Learning Representations, Apr. 26-30, 2020, Addis Ababa, Ethiopia, pp. 1-12.

Koh et al., "Wilds: A Benchmark of in-the-Wild Distribution Shifts.", arXiv:2012.07421v1, Dec. 14, 2020, 87 pages.

Kulkarni et al., "Survey of Personalization Techniques for Federated Learning.", arXiv:2003.08673v1, Mar. 19, 2020, 4 pages.

Li et al., "Deeper, Broader and Artier Domain Generalization.", arXiv:1710.03077v1, Oct. 9, 2017, 9 pages.

Li et al., "Ditto: Fair and Robust Federated Learning Through Personalization.", arXiv:2012.04221v3, Jun. 15, 2021, 32 pages.

Li et al., "FedBN: Federated Learning on Non-IID Features via Local Batch Normalization.", The Ninth International Conference on Learning Representations, Virtual Only, May 3-7, 27 pages.

Li et al., "Federated Optimization in Heterogeneous Networks.", Third Conference on Machine Learning and Systems, Austin, Texas, Mar. 2-4, 2020, 23 pages.

Li et al., "FedMD: Heterogenous Federated Learning via Model Distillation.", arXiv:1910.03581v1, Oct. 8, 2019, 8 pages.

Liang et al., "Think Locally, Act Globally: Federated Learning with Local and Global Representations.", arXiv:2001.01523v3, Jul. 14, 2020, 34 pages.

Lin et al., "Ensemble Distillation for Robust Model Fusion in Federated Learning.", Conference on Neural Information Processing Systems, Virtual Only, Dec. 6-12, 2020, 13 pages.

Lindgren et al., "Efficient Training of Retrieval Models Using Negative Cache.", Advances in Neural Information Processing Systems, vol. 34, 2021, pp. 1-13.

Liu et al., "A Bandit Approach to Maximum Inner Product Search", AAAI Conference on Artificial Intelligence, vol. 33, No. 01, Jul. 2019, pp. 1-11.

Malkov et al., "Efficient and Robust Approximate Nearest Neighbor Search Using Hierarchical Navigable Small World Graphs.", Institute of Electrical and Electronics Engineers Transactions on Pattern Analysis and Machine Intelligence, vol. 42, No. 4, 2020, pp. 1-13.

Mansour et al., "Three Approaches for Personalization with Applications to Federated Learning." arXiv:2002.10619v1, Feb. 25, 2020, 23 pages.

May et al., "On Computing Nearest Neighbors with Applications to Decoding of Binary Linear Codes.", Advances in Cryptology—EUROCRYPT, 2015, Berlin, Heidelberg, pp. 203-228.

McMahan et al., "Communication-Efficient Learning of Deep Networks from Decentralized Data.", Conference on Artificial Intelligence and Statistics, Fort Lauderdale, Florida, Apr. 20-22, 2017, 10 pages.

Miech et al., "Thinking Fast and Slow: Efficient Text-to-Visual Retrieval with Transformers.", Institute of Electrical and Electronics Engineers/CVF Conference on Computer Vision and Pattern Recognition (CVPR), Jun. 2021, Nashville, Tennessee, United States, pp. 1-16.

Oh et al., "FedBABU: Towards Enhanced Representation for Federated Image Classification.", International Conference on Learning Representations, Virtual Only, Apr. 25-29, 2022, 29 pages.

Papernot et al., "SoK: Towards the Science of Security and Privacy in Machine Learning.", arXiv:1611.03814v1, Nov. 11, 2016, 19 pages.

Peng et al., "Moment Matching for Multi-Source Domain Adaptation.", Institute of Electrical and Electronics Engineers/CVF international Conference on Computer Vision, Seoul, South Korea, Oct. 27-Nov. 2, 2019, pp. 1406-1415.

Peterson et al., "Private Federated Learning with Domain Adaptation.", arXiv:1912.06733v1, Dec. 13, 2019, 6 pages.

Ram et al., "Maximum Inner-Product Search Using Cone Trees.", Eighteenth Association for Computing Machinery SIGKDD International Conference on Knowledge Discovery and Data Mining, 2012, New York, NY, United States, pp. 1-22.

Reisser et al., "Federated Mixture of Experts.", arXiv:2107.06724v1, Jul. 14, 2021, 20 pages.

Ren et al., "Hm-Ann: Efficient Billion-Point Nearest Neighbor Search on Heterogeneous Memory.", Advances in Neural Information Processing Systems, vol. 33, 2020, pp. 1-13.

RezaAbbasifard et al., "Survey on Nearest Neighbor Search Methods.", International Journal of Computer Applications, vol. 95, No. 25, Jun. 2014, pp. 39-52.

Ruder et al., "An Overview of Multi-Task Learning in Deep Neural Networks,", arXiv:1706.05098v1, Jun. 15, 2017, 14 pages.

Rudovic et al., "Personalized Machine Learning for Robot Perception of Affect and Engagement in Autism Therapy.", Science Robotics, vol. 3, Issue 19, eaao6760, Jun. 30, 2018, 11 pages.

Sahu et al., "On the Convergence of Federated Optimization in Heterogeneous Networks.", arXiv:1812.06127v1, Dec. 14, 2018, 12 pages.

Shrivastava et al., "Asymmetric LSH (ALSH) for Sublinear Time Maximum Inner Product Search (MIPS).", Advances in Neural Information Processing Systems, vol. 27, May 22, 2014, pp. 1-19.

Simhadri et al., "Results of the NeurIPS'21 Challenge on Billion-Scale Approximate Nearest Neighbor Search.", Proceedings of Machine Learning Research, vol. 176, May 8, 2022, pp. 177-189.

Smith et al., "Federated Multi-Task Learning.", Neural Information Processing Systems, Long Beach, California, United States, Dec. 4-8, 2017, 11 pages.

Venkateswara et al., "Deep Hashing Network for Unsupervised Domain Adaptation.", Conference on Computer Vision and Pattern Recognition. Honolulu, Hawaii, United States, Jul. 21-26, 2017, pp. 5018-5027.

Wang et al., "A Comprehensive Survey and Experimental Comparison of Graph-Based Approximate Nearest Neighbor Search.", VLDB Endowment, vol. 14, No. 11, Jul. 2021, pp. 1-28.

Wang et al., "Federated Evaluation of On-Device Personalization.", arXiv.1910.10252v1, Oct. 22, 2019, 6 pages.

Wang et al., "Hashing for Similarity Search: A Survey.", Computing Research Repository, arXiv:1408.2927, 2014, 29 pages.

Yang et al., "CondConv: Conditionally Parameterized Convolutions for Efficient Inference", Advances in Neural Information Processing Systems, Vancouver, Canada, Dec. 8-14, 2019, 12 pages.

Yen et al., "Loss Decomposition for Fast Learning in Large Output Spaces.", Thirty-fifth International Conference on Machine Learning, vol. 80 of Proceedings of Machine Learning Research, Jul. 10-15, 2018, Stockholm, Sweden, pp. 1-10.

Yu et al., "Salvaging Federated Learning by Local Adaptation", arXiv:2002.04758v1, Feb. 12, 2020, 10 pages.

Zec et al., "Federated Learning Using a Mixture of Experts.", arXiv:2010.02056v2, Nov. 23, 2020, 10 pages.

(56) References Cited

OTHER PUBLICATIONS

Zhang et al., "A Convex Formulation for Learning Task Relationships in Multi-Task Learning.", Conference on Uncertainty in Artificial Intelligence, Catalina Island, California, United States, Jul. 8-11, 2010, 10 pages.

Zhang et al., "A Survey on Multi-Task Learning.", arXiv:1707.08114v1, Jul. 25, 2017, 20 pages.

Zhang et al., "Parameterized Knowledge Transfer for Personalized Federated Learning.", Advances in Neural Information Processing Systems, Virtual Only, Dec. 5-13, 2021, 13 pages.

Zhang et al., "Personalized Federated Learning with First Order Model Optimization", International Conference on Learning Representations, Virtual Only, May 3-7, 2021, 17 pages.

Zhang et al., "Two-Stage Model Synthesis for Efficient Inference.", Conference on Computer Vision and Pattern Recognition, Virtual Only, Jun. 19-25, 2021, pp. 3081-3090.

Zhou et al., "Distilled One-Shot Federated Learning.", arXiv:2009.07999v, Oct. 26, 2020, 14 pages.

\* cited by examiner

Pseudo-Code (300)

| Quantization-Based ANN |
|---|
| 1: procedure QUANTIZEDSEARCH($\bar{\mathcal{X}}, t, q$) |
| 2:     $S_0 \leftarrow \{1, \ldots, n\}$ |
| 3:     for $i \leftarrow 1$ to $m$ do     ▷ Iterate over quantizations in ascending bitrate order |
| 4:         $S_i \leftarrow t_i\text{-arg}\min_{j \in S_{i-1}} D(q, \bar{X}_j^{(i)})$   ▷ Narrow candidate set to $t_i$ elements, using $\bar{\mathcal{X}}^{(i)}$ |
| 5:     end for |
| 6:     return $S_m$     ▷ Computes the $t_m$ nearest neighbors to $q$ |
| 7: end procedure |

FIG. 3

TUNING APPROXIMATE NEAREST NEIGHBOR SEARCH ENGINES FOR SPEED-RECALL TRADEOFFS VIA LAGRANGE MULTIPLIER METHODS

PRIORITY CLAIM

The present application claims the benefit of priority of U.S. Provisional Application Ser. No. 63/410,536, filed on Sep. 27, 2022, titled TUNING APPROXIMATE NEAREST NEIGHBOR SEARCH ENGINES FOR SPEED-RECALL TRADEOFFS VIA LAGRANGE MULTIPLIER METHODS, which is incorporated herein by reference.

FIELD

The present disclosure relates generally to search engines, and more particularly to tuning approximate nearest neighbor (ANN) search engines for speed-recall tradeoffs via Lagrange multiplier methods.

BACKGROUND

Efficient nearest neighbor search is an integral part of approaches to numerous tasks in machine learning and information retrieval; it has been leveraged to effectively solve a number of challenges in recommender systems, coding theory, multimodal search, and language modeling. Vector search over the dense, high-dimensional embedding vectors generated from deep learning models has become especially important following the rapid rise in capabilities and performance of such models. Nearest neighbor search is also increasingly being used for assisting training tasks in machine learning. However, as the number of elements to search over scales to large numbers, finding the "exact" nearest neighbor to a query becomes computationally inefficient. Thus, when the number of search elements is sufficiently large, a transformation to an approximate nearest neighbor (ANN) search paradigm may be applied.

The ANN search problem is fundamental to efficiently serving many real-world machine learning applications. A number of techniques have been developed for ANN search that allow queries over large datasets to be answered with low latency and high accuracy. However, such techniques often require setting numerous hyperparameters that affect the speed-recall tradeoff, and suboptimal settings may degrade performance significantly from the maximum achievable.

SUMMARY

Aspects and advantages of embodiments of the present disclosure will be set forth in part in the following description, or can be learned from the description, or can be learned through practice of the embodiments.

The embodiments are directed towards automatically tuning quantization-based approximate nearest neighbor (ANN) search methods and systems (e.g., search engines) to perform at the speed-recall pareto frontier. With a desired search cost or recall as input, the embodiments employ Lagrangian-based methods to perform constrained optimization on theoretically-grounded search cost and recall models. The resulting tunings, when paired with a set of tuning parameters (e.g., a vector of tuning parameters), exhibit excellent performance on standard benchmarks while requiring minimal tuning or configuration complexity.

One example aspect of the present disclosure is directed to a computer-implemented method for operating a search engine. The method may include generating, at a computing device, a recall loss function. The recall loss function may indicate an error metric for the search engine. The recall loss function may be based on a tuning vector and a set of approximate nearest neighbor (ANN) search results. The set of ANN search results may be based on a multi-level set of quantizations of a set of vector embeddings for a set of data objects. A tradeoff objective function may be generated at the computing device. The tradeoff objective function may indicate a tradeoff between the error metric and a search cost for the search engine. The tradeoff objective function may be based on the recall loss function, a search cost constraint, the tuning vector, and a Lagrange multiplier. A value for the Lagrange multiplier may be determined at the computing device. Determining the value of the Lagrange multiplier may be based on a value for the tradeoff between the error metric and the search cost for the search engine. Values for components of the tuning vector may be determined at the computing device. Determining the values for the components may be based on the value for the Lagrange multiplier and the tradeoff objective function. The search engine may be configured at the computing device. Configuring the search engine may be based on (or in accordance with) the values for the components of the tuning vector.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which:

FIG. 1 depicts an example search environment that various embodiments may be practiced in;

FIG. 3 shows a non-limiting example of pseudo-code to implement a method that employs the quantization index of FIG. 2 for ANN search, according to various embodiments;

DETAILED DESCRIPTION

Figure 1:
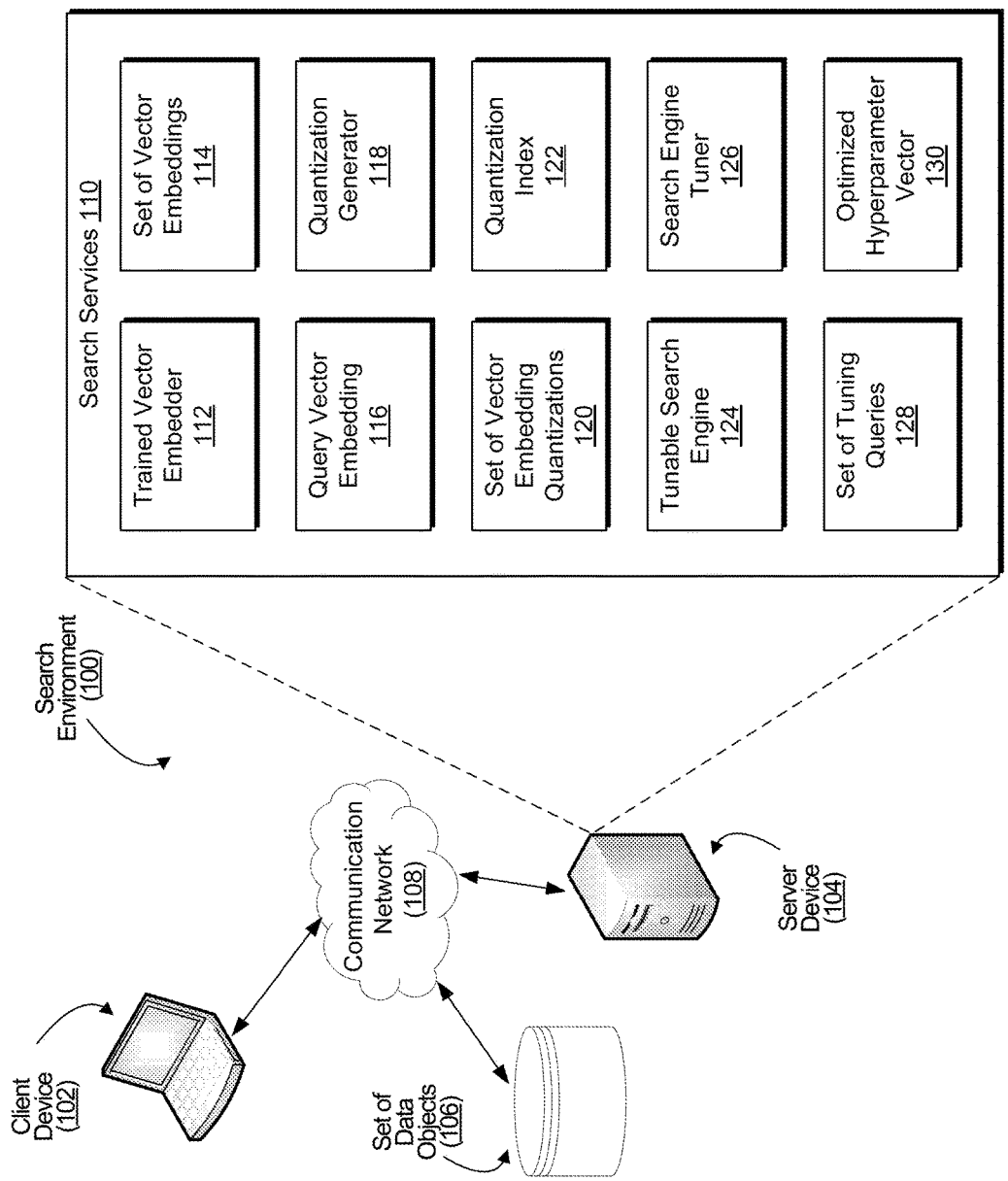

Efficient nearest neighbor search is an integral part of approaches to numerous tasks in machine learning and information retrieval. For example, nearest neighbor search has been leveraged to effectively solve a number of challenges in recommender systems, coding theory, multimodal search, and language modeling. Vector search over the dense, high-dimensional embedding vectors generated from deep learning models has become especially important following the rapid rise in capabilities and performance of such models. Nearest neighbor search is also increasingly being used for assisting training tasks in machine learning. However, as the number of elements to search over scales to large numbers, finding the "exact" nearest neighbor to a query becomes computationally inefficient. Thus, when the number of search elements is sufficiently large, a transformation to an approximate nearest neighbor (ANN) search paradigm may be applied.

The embodiments are directed towards automatically tuning quantization-based ANN search methods and systems (e.g., search engines) to perform at the speed-recall pareto frontier. With a desired search cost or recall as input, the embodiments employ Lagrangian-based methods to perform constrained optimization on theoretically-grounded search cost and recall models. The resulting tunings, when paired with the efficient quantization-based ANN implementation of the embodiments, exhibit excellent performance on standard benchmarks while requiring minimal tuning or configuration complexity.

Formally, the nearest neighbor search problem is as follows: an n-item dataset $\in^{n \times d}$ composed of d-dimensional vectors may be given or inputted. A function for computing the distance (e.g., a distance function and/or metric) between two vectors $D: \mathbb{R}^d \times \mathbb{R}^d \to \mathbb{R}$ may also be given, inputted, and/or defined. For a query vector $q \in \mathbb{R}^d$, the embodiments find the indices of the k-nearest neighbors in the dataset to q:

$$k - \underset{i \in \{1,\ldots,n\}}{\operatorname{argmin}} D(q, \chi_i).$$

Common choices of D (e.g., a distance metric) include $D(q,x)=-(q,x)$ for maximum inner product search (MIPS) and $D(q,x)=\|q-x\|_2^2$ for Euclidean distance search. A linear-time scan over $\chi$ solves the "exact" nearest neighbor search problem but doesn't scale to the large dataset sizes often found in modern-day applications. In order to remain practically computable, this dramatic increase in complexity with scaling the dataset size necessitates the development of approximate nearest neighbor (ANN) algorithms.

A number of conventional approaches to the ANN problem have been attempted to control the trade off a small search accuracy loss, measured in result recall, for a correspondingly large increase in search speed. However, these conventional approaches rely on tuning a number of hyperparameters that adjust the tradeoff between speed and recall, and poor hyperparameter choices may result in performance far below what is achievable at the same recall with ideal hyperparameter tuning. One conventional approach to tuning is performing a brute force grid search that empirically measures recall and speed using sample queries and finds tunings on the pareto frontier. However, empirically measuring recall is an expensive process; capturing samples for even a few thousand tunings might take days. Combined with the observation that the number of hyperparameters necessary for efficient ANN grows with respect to dataset size, it is found that the algorithmic tuning space is too large to practically grid-search for billions-scale datasets.

As a result, efficient ANN search at the billions-scale is conventionally achievable only with domain expertise in ANN algorithms and an understanding of how various algorithmic hyperparameters interact with each other and affect overall performance. This barrier to entry is becoming increasingly problematic with the growth in dataset sizes and in the popularity of the ANN-based retrieval paradigm. To counter these issues with conventional approaches, the embodiments are directed towards highly performant ANN indices may be created and tuned with minimal configuration complexity to the end user.

More specifically, the embodiments employ theoretically-grounded models for recall and search cost for quantization-based ANN algorithms. The embodiments further employ efficient Lagrange multipliers-based techniques for optimizing either of these metrics with respect to the other (i.e., recall and search cost). The embodiments include a constrained optimization approach that is very general that may be extended to distance measures, quantization algorithms, and search paradigms beyond those that are explicitly discussed herein.

The embodiments include methods directed towards tuning ANN algorithms in online (e.g., real time) and offline modes. In an online mode, the search algorithm must respond to a sufficiently voluminous stream of latency-sensitive queries arriving at roughly constant frequency. Such online modes may be employed in recommender and semantic systems where ANN latency directly contributes to smoothness of the end-user experience. Due to the latency-sensitive nature of these applications, query batching may not be employed. A sample set of queries, representative of the overall query distribution, may be employed to tune a data structure used by the embodiments.

Exact brute-force search methods typically fail to perform well in an online mode, where the lack of batching makes search highly memory-bandwidth constrained. The embodiments directed towards approximate search algorithms are therefore generally preferred. The performance of the embodiments may be evaluated along two axes: (1) accuracy and (2) search cost. Accuracy may be quantified (e.g., benchmarked) via recall@ k, where k is the desired number of neighbors. In other embodiments, the c-approximation ratio (e.g., the ratio of the approximate and the true nearest-neighbor distance) may be employed to quantify the accuracy axis. The search cost axis may be quantified (e.g., benchmarked) via by the average number of queries per second (QPS) a given server can handle.

Aspects of the present disclosure provide a number of technical effects and benefits. The technical effects and benefits may be measured via various accuracy and search cost (e.g., computational complexity or efficiency) benchmarks. For instance, when compared to brute force (or exhaustive) conventional grid search techniques applied to millions-scale datasets, the embodiments (which are significantly more computationally efficient than these conventional brute-force methods) provide similar or even enhanced performance. Furthermore, the embodiments achieve superior performance to tunings generated by a black-box optimizer on the same ANN index, and over conventional methods to various benchmark (e.g., computation efficiency and recall) for hyperparameter tuning on billions-scale datasets.

FIG. 1 depicts an example search environment 100 that various embodiments may be practiced in. Search environment 100 may include a include a client device 102, a server device 104, and a set of data objects 106 that are communicatively coupled via a communication network 108. The servicer device 104 may implement search services 110 for the client device 102. That is, client device 102 may provide a search query to the search services 110. The search query may be a query to search over objects included in the set of data objects 106. The search services 110 may return a subset of the set of data objects 106 to the client device 102. The subset of the set of data objects 106 may at least approximately match the search query.

To perform its search functions and capabilities, search services 110 may include a trained vector embedder 112, a set of vector embeddings 114, and a query vector embedding 116. Search services 110 may also include a quantization index generator 118, a set of vector embedding quantizations 120, a quantization index 122, and a tunable search engine 124. Furthermore, search services 110 may include a search engine tuner 126, a set of tuning queries 128, and an optimized hyperparameter vector 130.

The trained vector embedder 112 is generally responsible for generating a vector embedding for each data object of the set of data objects 106. That is, the trained vector embedder 112 is responsible for generating the set of vector embeddings 114. The set of vector embeddings may include one or more vector embeddings for each data object of the set of data objects 106. Accordingly, each vector embedding of the set of vector embeddings 114 may be a data object vector embedding for a corresponding data object of the set of data objects 106. In some embodiments, there may be a one-to-one correspondence between the data objects of the set of data objects 106 and the vector embeddings of the set of vector embeddings. In addition to generating the set of vector embeddings 114 for the set of data objects, the trained vector embedder 112 may generate the query vector embedding 116 for a search query received from the client device 102. The vector embeddings of the set of vector embeddings 114 (e.g., data object vector embeddings) and the query vector embedding 116 may be vectors within the same vector space.

The tunable search engine 124 may perform approximate nearest neighbor (AAN) searches over the set of data objects 106, based on one or more queries. As such, quantization generator 118 is generally responsible for generating the set of vector embedding quantizations 120. The set of vector embedding quantizations 120 may include a set of quantizations for each vector embedding of the set of vector embeddings. The set of quantizations for a vector embedding may include a set of vector quantizations (VO) for the vector embedding and a set of product quantizations (PQ) for the vector embedding. The quantization generator 118 may additionally generate the quantization index 122. The quantization index 122 and the set of vector embedding quantizations 120 are discussed at least in conjunction with FIG. 2. However, briefly here, the quantization index 122 may be a multi-level quantization hierarchy composed of multiple VQ layers and multiple PQ layers corresponding to a hierarchical structure (e.g., an index) of the set of vector embedding quantizations 120. The tunable search engine 124 may employ the set of vector embedding quantizations 120 and the quantization index 122 to efficiently search (e.g., ANN search) over the set of data objects 106, and find search results matching a search query (e.g., corresponding to the query vector embedding 116). Various embodiments of a ANN search method (employed by the tunable search engine 124) are discussed in conjunction with at least FIG. 3.

The tunable search engine 124 may be tuned via the optimized hyperparameter vector 130. Each component of the optimized hyperparameter vector 130 may correspond to a hyperparameter for searching the set of vector embedding quantizations (and the quantization index 122). The search engine tuner 126 may find (or generate) the optimized hyperparameter vector 130 within a vector space of hyperparameters. The search engine tuner 126 may employ the set of tuning queries 128 to generate the optimized hyperparameter vector 130. The set of tuning queries 128 may be a set of training queries.

Figure 2:
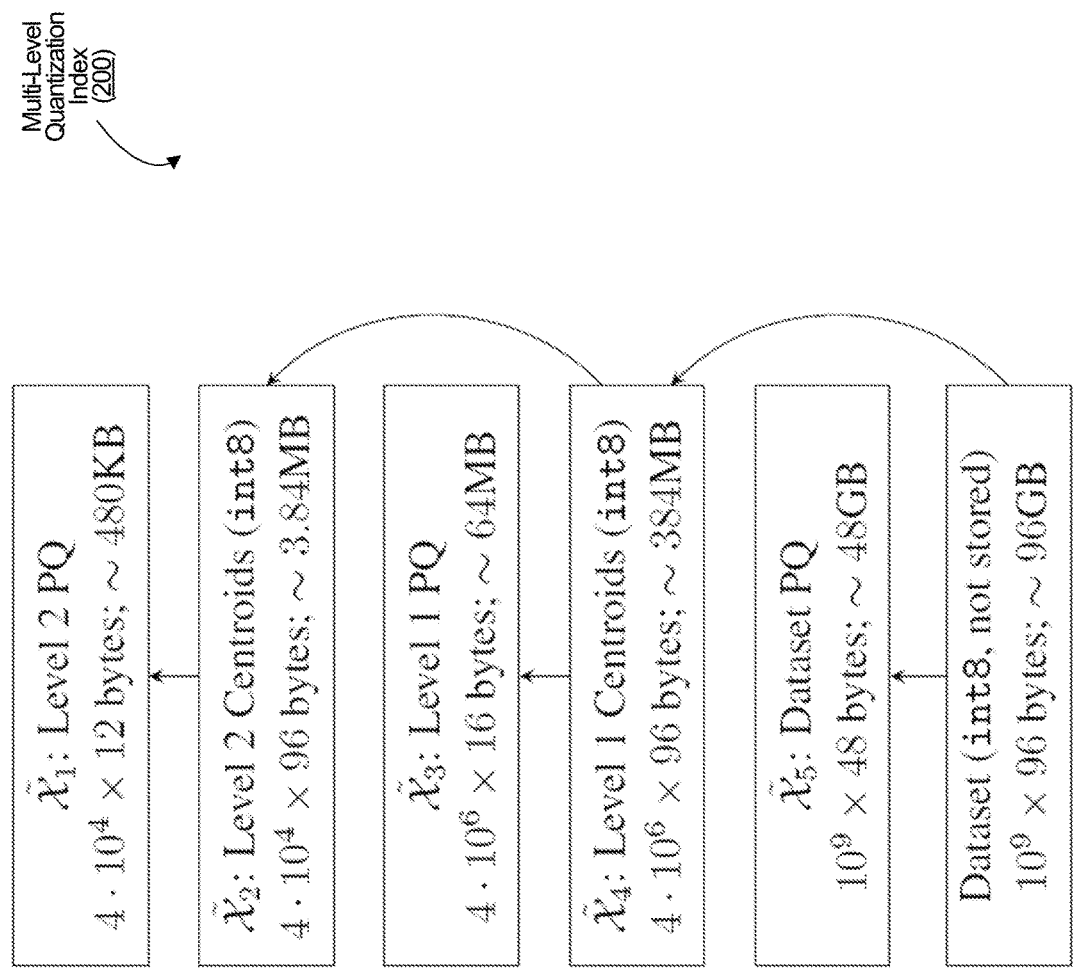
FIG. 2 depicts an example multi-level hierarchical quantization index according to various embodiments.

FIG. 2 depicts an example multi-level hierarchical quantization index 200 according to various embodiments. The quantization index 200 may be equivalent or similar to the quantization index 122 of FIG. 1. As such, the quantization index 200 may be a multi-level quantization hierarchy composed of multiple vector quantization (VQ) layers and multiple product quantization (PQ) layers. That is, the embodiments employ hierarchical quantization index 200, which includes VQ layers and PQ layers. The below discussion first provides a brief review of VQ and PQ before describing how VQ and PQ are composed to produce a performant ANN search index.

Vector-quantizing an input set of vectors $C \in ^{n \times d}$, which is denoted as VQ(X), produces a codebook $C \in ^{c \times d}$ and codewords $w \in \{1, 2, \ldots, c\}^n$. The set referred to as X may be equivalent or similar to the set of vector embeddings 114 of FIG. 1. Each element of X is quantized to the closest codebook element in C, and the quantization assignments are stored in w. The quantized form of the ith element of $\chi$ can therefore be computed as $\chi_i = C_{w_i}$.

The embodiments may employ VQ by computing the closest codebook elements to the query via:

$$S := \underset{i \in \{1,2,\ldots,c\}}{k\text{-argmin}} D(q, C_i),$$

and returning indices of datapoints belonging to those codebook elements, $\{j | w_j \in S\}$. This candidate set may also be further refined by higher-bitrate distance calculations to produce a final result set. In this manner, VQ can be interpreted as a pruning tree whose root stores C and has c children; the ith child contains the points $\{\chi_j | w_j = i\}$; equivalently, this tree is an inverted index which maps each centroid to the datapoints belonging to the centroid.

In contrast to VQ, PQ divides the full d-dimensional vector space into K subspaces and quantizes each space separately. If it is assumed that the subspaces are all equal in dimensionality, each covering $l = [d/K]$ dimensions, then PQ gives K codebooks $C^{(1)}, \ldots, C^{(K)}$ and K codeword vectors $w^{(1)}, \ldots, w^{(K)}$, with $C^{(k)} \in \mathbb{R}^{c_k \times l}$ and $w^{(k)} \in \{1, \ldots, c_k\}^n$ where $c_k$ is the number of centroids in subspace k. The approximate representation of $_i$ under PQ can be recovered as the concatenation of $$\left\{ C^{(k)}_{w_i^{(k)}} \middle| k \in \{1, \ldots, K\} \right\}.$$

In the embodiments directed towards ANN search, VQ is generally performed with a large codebook whose size scales with n and whose size is significant relative to the size of the codewords. In contrast, PQ is generally performed with a constant, small $c_k$ that allows for fast in-register single instruction/multiple data (SIMD) lookups for each codebook element, and its storage cost is dominated by the codeword size.

VQ and PQ both produce fixed-bitrate encodings of the original dataset. However, if it is desired to allocate more bitrate to the vectors closer to the query, such matching of bitrates may be achieved by using multiple quantization levels and using the lower-bitrate levels to select which portions of the higher-bitrate levels to evaluate.

To generate the multiple levels of hierarchical quantization index 200, one may start with the original dataset and vector-quantize it, resulting in a smaller d-dimensional dataset of codewords C. VQ may be recursively applied to C for arbitrarily many levels, and all C are product-quantized as well. This procedure of generating quantization index 200 results in a set of quantizations $\tilde{\chi}_1, \ldots, \tilde{\chi}_m$ of progressively higher bitrate. The resulting set of quantizations (e.g., both VQ and PQ) may comprise the set of vector embedding quantizations 120 of FIG. 1.

FIG. 3 shows a non-limiting example of pseudo-code 300 to implement a method that employs the quantization index 200 of FIG. 2 for ANN search, according to various embodiments. When searching, the tunable search engine 124 of FIG. 1 may implement a method equivalent or similar to pseudo-code 300. Furthermore, when the search engine tuner 126 is optimizing the hyperparameter vector (e.g., optimized hyperparameter vector 130 of FIG. 1), the method of pseudo-code 300 may be employed. The method of pseudo-code 300 performs a ANN search using the quantization index 200 of FIG. 2 and the set of vector embedding quantizations 120 and a length-m vector of search hyperparameters t, which controls how quickly the candidate set of neighbors is narrowed down while iterating through the quantization levels. The optimized hyperparameter vector 130 may be equivalent or similar to the length-m vector of search hyperparameters t. The search engine tuner 126 of FIG. 1 is responsible for optimizing the components of the length-m vector of search hyperparameters t.

The search engine tuner 126 finds values for the components of t that give excellent tradeoffs between search speed and recall. The following illustrates various proxy metrics for ANN recall and search latency as a function of the tuning t, and then describe a Lagrange multipliers-based approach to efficiently computing t to optimize for a given speed-recall tradeoff.

The following discussion details various operations of the components of search services 101 of FIG. 1. Notably, the operations of the search engine tuner are discussed for its optimization of the optimized hyperparameter vector 130. For a given query set $Q$ and hyperparameter tuning t, the recall may be computed by simply performing approximate search over $Q$ and computing the recall empirically. The set of tuning queries 128 may be equivalent or similar to the query set $Q$. However, such an approach may not provide sufficiently-efficient optimization over t. Below this empirical recall is approximated in a manner amenable to the constrained optimization approach.

First fix the dataset $\chi$ and all quantizations $\tilde{\chi}^{(i)}$. The quantizations $\tilde{\chi}^{(i)}$ may be similar to set of vector embedding quantizations 120 of FIG. 1, which as discussed above, may be generated by quantization generator 118 of FIG. 1. The quantization index 122 of FIG. 1 may encode the hierarchy of the quantizations. Define functions $S_0(q,t), \ldots, S_m(q,t)$ to denote the various $S$ computed by pseudo-code 200 for query q and tuning t, and let $G(q)$ be the set of ground-truth nearest neighbors for q. Note that this recall equals $$\frac{|S_m(q, t) \cap G(q)|}{|G(q)|}$$

for a given query q and tuning t. This recall may be decomposed into a telescoping product and multiply it among all queries in $Q$ to derive the following expression for geometric-mean recall:

$$GeometricMeanRecall(\cdot, t) = \prod_{q \in Q} \prod_{i=1}^{m} \left(\frac{|S_i(q, t) \cap G(q)|}{|S_{i-1}(q, t) \cap G(q)|}\right)^{1/|Q|}, \quad (1)$$

where the telescoping decomposition takes advantage of the fact that $|S_0(q,t) \cap G(q)| = |G(q)|$ due to $S_0$ containing all datapoint indices. Some embodiments may employ the geometric mean for aggregating recall over a query set. Other embodiments may employ the arithmetic mean for aggregating recall over a query set. The geometric mean discussion focusses on the geometric mean embodiments. Note that geometric embodiments enable the decomposition in log-space. Note that the arithmetic mean is bounded from below by the geometric mean.

Maximizing Equation 1 is equivalent to minimizing its negative logarithm:

$$\mathcal{L}(Q, t) = -\frac{1}{|Q|} \sum_{q \in Q} \sum_{i=1}^{m} \log \frac{|S_i(q, t) \cap G(q)|}{|S_{i-1}(q, t) \cap G(q)|} \quad (2)$$

$$= \sum_{i=1}^{m} \mathbb{E}_{q \in Q}\left[-\log \frac{|S_i(q, t) \cap G(q)|}{|S_{i-1}(q, t) \cap G(q)|}\right]$$

Next, the discussion focusses on the inner quantity inside the logarithm and how to compute it efficiently. The chief problem is that $S_i(q,t)$ has an implicit dependency on $S_{i-1}(q,t)$ because $S_{i-1}$ is the candidate set from which the embodiments compute quantized distances using $\tilde{\chi}^{(i)}$ in pseudo-code 200. This results in $S_i(q,t)$ depending on all $t_1, \ldots, t_i$ and not just $t_i$. Thus, in some embodiments, the single-layer candidate set is defined as:

$$S'(q, t_i) = t_i - \min_{j \in \{1, \ldots, n\}} D(q, \tilde{\chi}_j^{(i)}), \quad (3)$$

which computes the closest $t_i$ neighbors to q according to only $\tilde{\chi}^{(i)}$ irrespective of other quantizations or their tuning settings. This definition may be leveraged by rewriting the cardinality ratio as:

$$\frac{|S_i(q, t) \cap G(q)|}{S_{i-1}(q, t) \cap G(q)} = \frac{\sum_{g \in G(q)} \mathbb{1}_{g \in S_i(q,t)}}{\sum_{g \in G(q)} \mathbb{1}_{g \in S_{i-1}(q,t)}} \quad (4)$$

and making the approximation $\mathbb{1}_{g \in S_i(q,t)} \approx \mathbb{1}_{g \in S_{i-1}(q,t)} \mathbb{1}_{g \in S'_{i(q,t)}}$. This may be roughly equivalent to assuming most near-neighbors to q are included in $S_{i-1}(q,t)$. If zero covariance between $\mathbb{1}_{g \in S_{i-1}(q,t)}$ and $\mathbb{1}_{g \in S'_{i(q,t)}}$ is assumed, then the sum of products may be transformed into a product of sums:

$$\sum_{g \in G(q)} \mathbb{1}_{g \in S_{i-1}(q,t)} \mathbb{1}_{g \in S'_{i(q,t)}} \approx \left(\frac{1}{|G(q)|} \sum_{g \in G(q)} \mathbb{1}_{g \in S_{i-1}(q,t)}\right)\left(\sum_{g \in G(q)} \mathbb{1}_{g \in S'_{i(q,t)}}\right).$$

Combining this result from Equations 2 and 4, the final loss function may be $\sum_{i=1}^{m} \mathcal{L}_i(Q, t_i)$ with the per-quantization loss $\mathcal{L}_i$ defined as:

$$\mathcal{L}_i(Q, t_i) = \mathbb{E}_{q \in Q}\left[-\log \frac{|S'_i(q, t_i) \cap \mathcal{G}(q)|}{|\mathcal{G}(q)|}\right], \quad (5)$$

which allows us to compute the loss for any tuning t by summing m elements from L.

Similar to ANN recall, search cost may be directly measured empirically, but a simple yet effective search cost proxy compatible with the Lagrange optimization method of the embodiments is presented.

Let $|\tilde{\chi}^{(i)}|$ denote the storage footprint of $\tilde{\chi}^{(i)}$. At quantization level i, for i<m, selecting the top top $t_i$ candidates necessarily implies that a $t_i/n$ proportion of $\chi^{(i+1)}$ will need to be accessed in the next level. Meanwhile, $\tilde{\chi}^{(1)}$ is always fully searched because it's encountered at the beginning of the search process, where the method has no prior on what points are closest to q. From these observations, a model of the cost of quantization-based ANN search with a tuning t may be constructed as:

$$J(t) \triangleq \frac{1}{|\chi|} \cdot \left(|\tilde{\chi}^{(1)}| + \sum_{i=1}^{m-1} \frac{t_i}{n} \cdot |\tilde{\chi}^{(i+1)}|\right). \quad (6)$$

J gives the ratio of memory accesses performed per-query when performing approximate search with tuning t to the number of memory accesses performed by exact brute-force search. This gives a good approximation to real-world search cost because memory bandwidth is the bottleneck for quantization-based ANN in the non-batched case. It is emphasized that this cost model is effective for comparing amongst tunings for a quantization-based ANN index, which is sufficient for the present purposes, but likely lacks the power to compare performance among completely different ANN approaches, like graph-based solutions. Differences in memory read size, memory request queue depth, amenability to vectorization, and numerous other characteristics have a large impact on overall performance but are not captured in this model.

The convex hull of each per-quantization loss $\mathcal{L}_i$ may be taken before passing it into the constrained optimization procedure. This results in a better-behaved optimization result but is also justified from an ANN method perspective. For any quantization level i, consider some two choices of $t_i$ that lead to loss and cost contributions of $(l_1, j_1)$ and $(l_2, j_2)$. Any (loss, cost) tuple on the line segment between these two points may be achieved via a randomized algorithm that picks between the two choices of $t_i$ with the appropriate weighting, which implies the entire convex hull is achievable. Empirically, it may be found that $\mathcal{L}_i$ is close to convex already, so this is more of a theoretical safeguard than a practical concern.

Formally, the tuning problem of maximizing recall with a search cost limit $J_{max}$ may be phrased as:

$$\underset{t \in [0,n]^m}{\operatorname{argmin}} \sum_{i=1}^{m} \mathcal{L}_i(t_i),$$

which may be subject to the constraint that $$J(t) \leq J_{max}$$

$$t_1 \geq \ldots \geq t_m.$$

The objective function is a sum of convex functions and therefore convex itself, while the constraints are linear and strictly feasible, so strong duality holds for this optimization problem. Therefore, the Lagrangian may be utilized, as:

$$\underset{t \in [0,n]^m}{\operatorname{argmin}} - \lambda J(t) + \sum_{i=1}^{m} \mathcal{L}_i(t_i),$$

subject to the constraint $$t_1 \geq \ldots \geq t_m.$$

to find exact solutions to the constrained optimization, using $\lambda$ to adjust the recall-cost tradeoff. A method that uses $O(nm)$ preprocessing time to solve the minimization for a given value of $\lambda$ in $O(m \log n)$ time.

Furthermore, because the objective function is a sum of m functions, each a convex hull defined by n points, the pareto frontier itself will be piecewise, composed of at most nm points. It follows then that there are at most nm relevant $\lambda$ that result in different optimization results, namely those obtained by taking the consecutive differences among each $\mathcal{L}_i$ and dividing by $|\tilde{\chi}^{(i+1)}|/n|\chi|$. MIA By performing binary search among these candidate A, it may be found that the minimum-cost tuning for a given loss target, or the minimum-loss tuning for a given cost constraint, in $O(m \log n \log nm)$ time. In practice, even for very large datasets, m<10, so this routine runs very quickly.

Example Methods

FIGS. 4-7 depict flowcharts for various methods implemented by the embodiments. Although the flowcharts of FIGS. 4-7 depict steps performed in a particular order for purposes of illustration and discussion, the methods of the present disclosure are not limited to the particularly illustrated order or arrangement. Various steps of the methods of FIGS. 4-7 can be omitted, rearranged, combined, and/or adapted in various ways without deviating from the scope of the present disclosure. A computing device (e.g., client device 102 and/or server device 104 of FIG. 1) or a combination of computing devices may perform at least a portion of the steps included in the flowcharts of FIGS. 4-7. Various software components and/or modules implemented by the computing devices (e.g., search services 110 of FIG. 1) may implement at least a portion of the steps included in the flowcharts of FIGS. 4-7.

Figure 4:
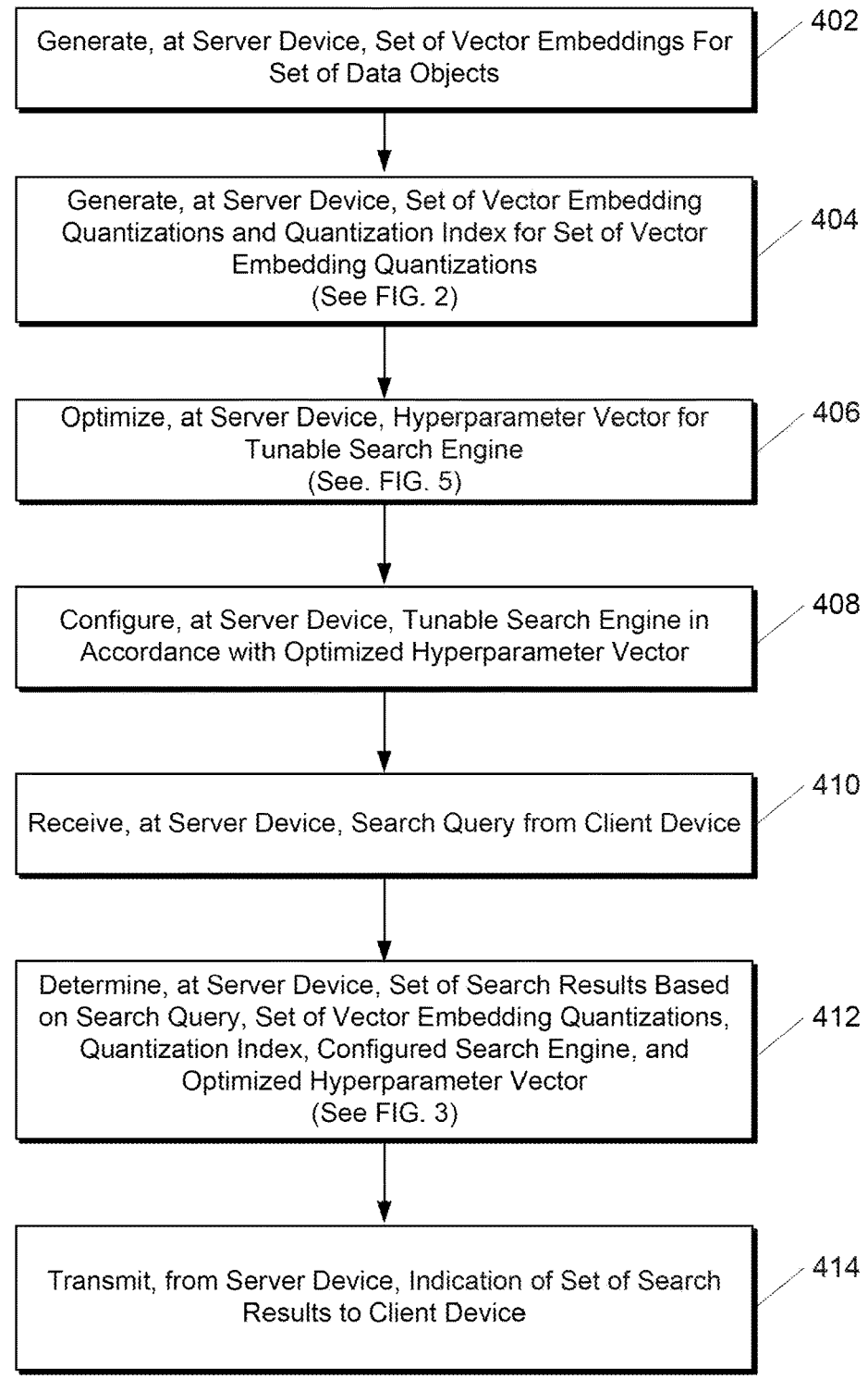
FIG. 4 depicts a flowchart diagram of an example method for providing search services to a client device according to example embodiments of the present disclosure.

FIG. 4 depicts a flowchart diagram of an example method 400 for providing search services to a client device according to example embodiments of the present disclosure. Method 400 begins at block 402, where a set of vector embeddings (e.g., set of vector embeddings 114 of FIG. 1) for a set of data objects (e.g., set of data objects 106 of FIG. 1) is generated at a server device (e.g., server device 104 of FIG. 1). At block 404, a set of vector embedding quantizations (e.g., vector embedding quantizations 120 of FIG. 1) and a quantization index (e.g., quantization index 122) for the set of vector embeddings quantizations is generated at the server advice. Various embodiments of a set of vector embedding quantizations and a quantization index are discussed, as least in conjunction with FIG. 2. At block 406, a hyperparameter vector (e.g., t) for a tunable search engine (e.g., tunable search engine 124 of FIG. 1) is optimized at the server device. Various embodiments of optimizing a hyperparameter vector are discussed at least in conjunction with method 500 of FIG. 5. At block 408, the tunable search engine is configured in accordance with the optimized hyperparameter vector. The configuration of the tunable search engine may be performed at the server device. At block 410, a search query is received at the server device. The search query may have been transmitted from a client device (e.g., client device 102 of FIG. 1). At block 412, a set of search results is determined at the server device. Various embodiments of determining a set of search results are discussed at least in conjunction with pseudo-code 300 of FIG. 3. However, briefly here, determining the set of search results may be based on the received search query, the set of vector embedding quantizations, the quantitation index, the configured search engine, and the optimized hyperparameter vector. At block 414, and indication of the set of search results is transmitted from the server device to the client device.

Figure 5:
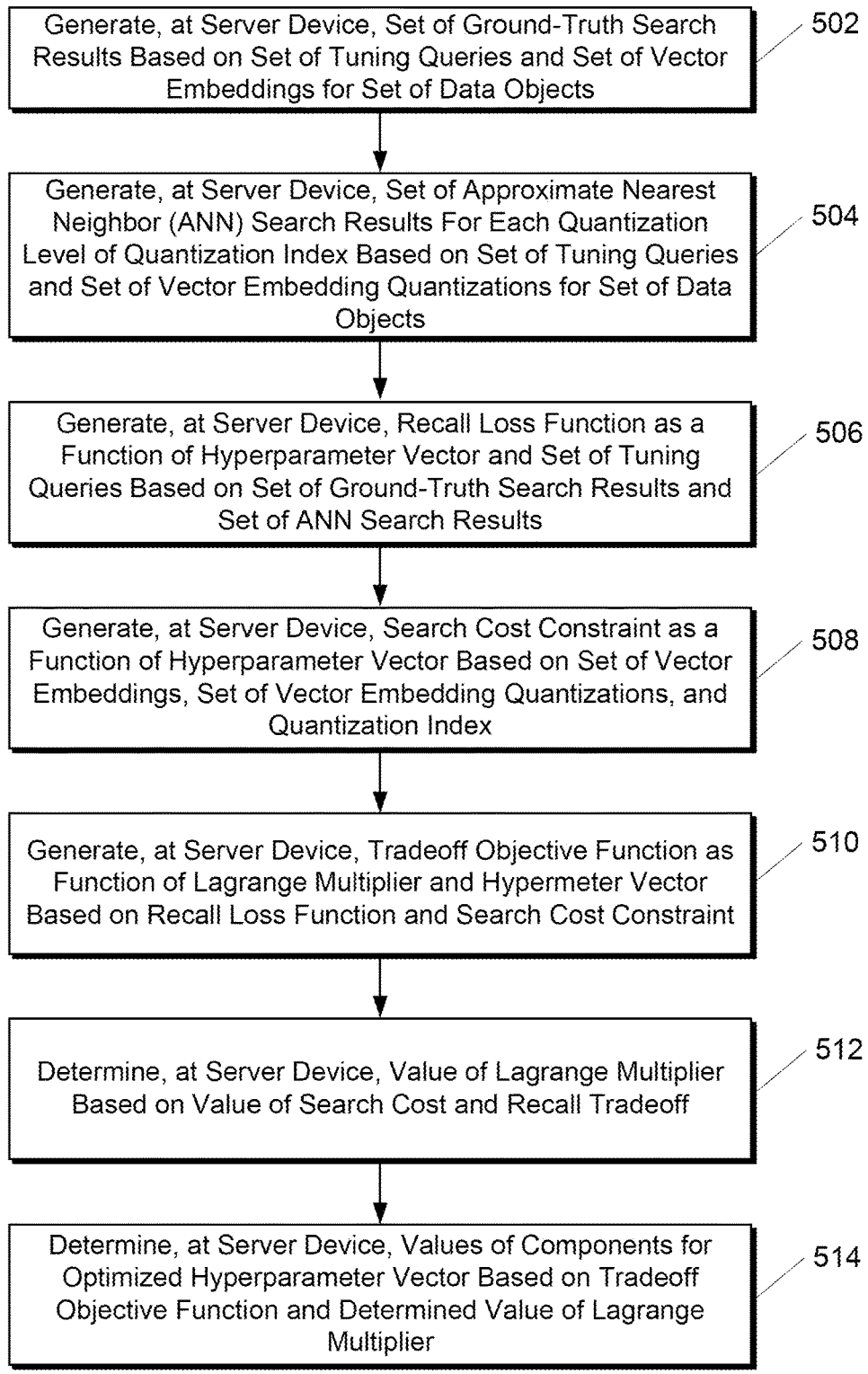
FIG. 5 depicts a flowchart diagram of an example method for optimizing a hyperparameter vector for a search engine according to example embodiments of the present disclosure.

FIG. 5 depicts a flowchart diagram of an example method 500 for optimizing a hyperparameter vector for a search engine according to example embodiments of the present disclosure. Method 500 begins at block 502, where a set of ground-truth search results (e.g., $\mathcal{G}$) is generated at the server device. Generating the set of ground truth search results may be based on a set of tuning queries (e.g., $\mathcal{Q}$) and a set of vector embeddings (e.g., set of vector embeddings 114 of FIG. 1) for a set of data objects (e.g., set of data objects 106 of FIG. 1). At block 504, a set of approximate nearest neighbor (ANN) search results (e.g., $S_1$) for each quantization level of the quantization index (e.g., quantization index 200 of FIG. 2 where the levels are addressed by the $\chi_i$) is generated at the server device. Generating the set of ANN search results (e.g., $S_i$) may be based on the set of tuning queries and a set of vector embedding quantity quantizations (e.g., $\chi_i$) for the set of data objects. At block 506, a recall loss function (e.g., see equations (1)-(5)) is generated at the server device. The recall loss function may be a function of the hyperparameter vector (e.g., or tuning vector t) and the set of tuning queries. The generation of the recall loss function may be based on the set of ground truth search results and the set of ANN search results. At block 508, a search cost constraint (e.g., see equation (6)) is generated at the server device. The search cost constraint maybe a function of the hyperparameter vector. Generating the search cost constraint may be based on a set of vector embeddings, the set of vector embedding quantizations, and the quantization index. At block 510, a tradeoff objective function is generated at the server device. The tradeoff objective function may be a function of a Lagrange multiplier (e.g., $\lambda$) and the hyperparameter vector. Generating the tradeoff objective function may be based on the recall loss function and the search cost constraint. At block 512, a value of the Lagrange multiplier is determined at the server device. Determining the value of those around multiplier maybe based on a value of a search cost and recall tradeoff. At block 514, values of components of the optimized hyperparameter vector may be determined at the server device. Determining the values of the components of the optimized hyperparameter vector maybe based on the tradeoff objective function and the determined value of the Lagrange multiplier.

Figure 6:
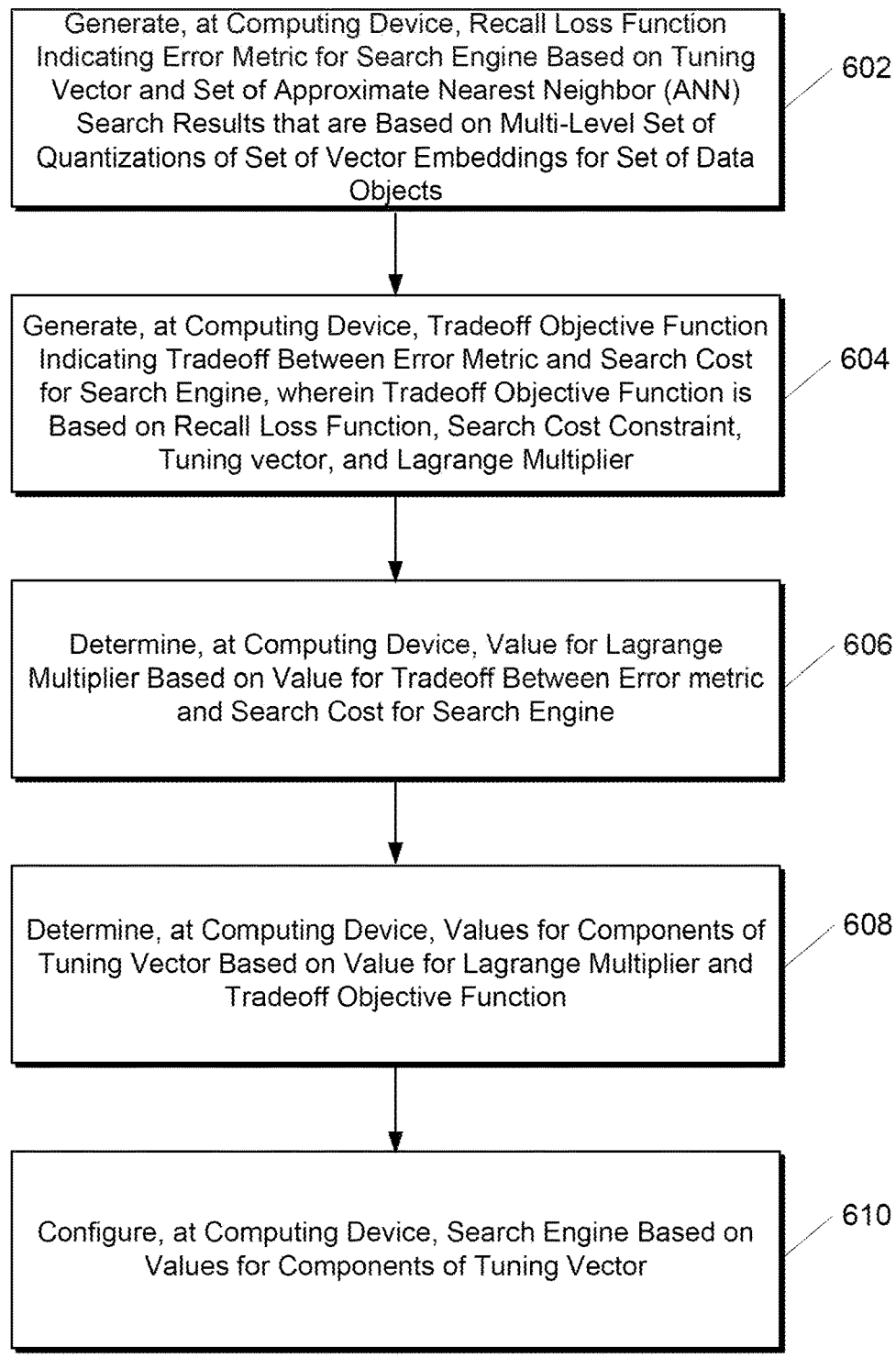
FIG. 6 depicts a flowchart diagram of an example method for tuning a tunable search engine according to example embodiments of the present disclosure.

FIG. 6 depicts a flowchart diagram of an example method 600 for tuning a tunable search engine according to example embodiments of the present disclosure. Method 600 begins at block 602, where a recall loss function (e.g., see equations (1)-(5)) is generated at a computing device (e.g., server device 104 of FIG. 1). The recall loss function may indicate an error metric (e.g., false negatives or Type II errors) for a search engine (e.g., tunable search engine 124 of FIG. 1). The recall loss function may be based on a tuning vector (e.g., a hyperparameter vector) and a set of approximate nearest neighbor (ANN) search results. The set of ANN search results may be based on a multi-level set of quantizations (e.g., set of vector embedding quantizations 120 of FIG. 1) of a set of vector embeddings (e.g., set of vector embeddings 114 of FIG. 1) for a set of data objects (e.g., set of data objects 106 of FIG. 1). Ay block 604, a tradeoff objective function may be generated at the computing device. The tradeoff objective function may indicate a tradeoff between the error metric and a search cost (e.g., J(t)) for the search engine. The tradeoff objective function is based on the recall loss function (e.g., $\mathcal{L}(\mathcal{Q}, t)$), a search cost constraint (e.g., see equation (6)), the tuning vector, and a Lagrange multiplier (e.g., $\lambda$). At block 606, a value for the Lagrange multiplier is determined at the computing device. Determining the value for the Lagrange multiplier may be based on a value for the tradeoff between the error metric and the search cost for the search engine. At block 608, values for components of the tuning vector are determined at the computing device. Determining the values for the components of the tuning vector may be based on the value for the Lagrange multiplier and the tradeoff objective function. At block 610, the search engine is configured at the computing device. Configuring the search engine may be based on the values for the components of the tuning vector.

In various embodiments, method 600 includes determining, at the computing device, a set of ground-truth search results. Determining the set of ground-truth search results may be based on a set of tuning queries and the set of vector embeddings for the set of data objects. The recall loss function may be generated at the computing device further based on the set of ground-truth search results. In some embodiments, the set of ANN search results are determined further based on a set of tuning queries.

In some embodiments, method 600 further includes receiving, at the computing device, a search query. The search query may be received from a client of the configured search engine. A set of search results may be determined, at the computing device, based on the search query and the configured search engine. The set of search results may be provided to the client of the configured search engine.

In various embodiments, method 600 may further include generating, at the computing device, a set of vector embeddings for the set of data objects. The multi-level set of quantizations for the set of vector embeddings may be generated based on the set of vector embeddings for the set of data objects. The multi-level set of quantizations for the set of vector embeddings may include a set of vector quantization (VQ) layers and a set of product quantization (PQ) layers.

In various embodiments, method 600 may further include generating, at the computing device, the set of vector embeddings for the set of objects. A set of ground-truth search results may be generated, at the computing device, based on a set of tuning queries and the set of vector embeddings for the set of objects. The set of ANN search results may be generated further based on the set of tuning queries and the multi-level set of quantization of the set of vector embeddings. The recall loss function may be generated, at the computing device, based on the set of ground-truth search results and the set of ANN search results.

In at least one embodiment, method 600 includes generating, at the computing device, the search cost constraint based on a set of vector embeddings and a quantization index corresponding to the multi-level set of quantizations of the set of vector embeddings for the set of data objects. The tradeoff objective function may be indicative of a speed-recall Pareto frontier for the tradeoff between the error metric and the search cost for the search engine. The search cost for the search engine may be based on the multi-level set of quantizations of a set of vector embeddings for a set of data objects.

Figure 7:
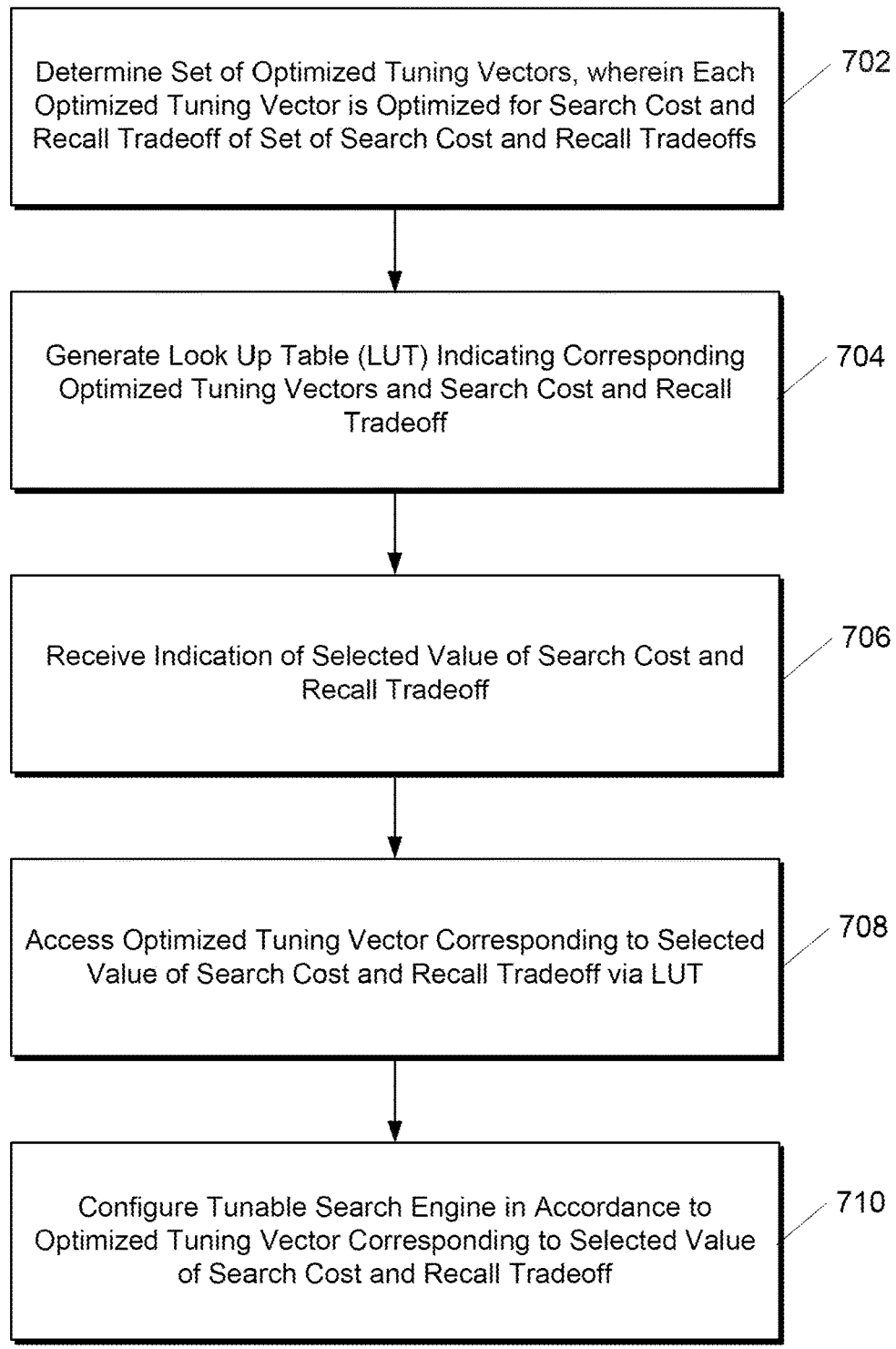
FIG. 7 depicts a flowchart diagram of an example method for configuring a search engine according to example embodiments of the present disclosure.

FIG. 7 depicts a flowchart diagram of an example method 700 for configuring a search engine according to example embodiments of the present disclosure. Method 700 begins at block 702, where a set of optimized tuning vectors is determined. Each optimized tuning vector of the set of optimized tuning vectors is optimized for a search cost and recall tradeoff of a set of search cost and recall tradeoffs. At block 704, a look up table (LUT) is generated. The LUT indicates (or encodes) corresponding optimized tuning vectors and search cost and recall tradeoffs. At block 706, an indication of a selected value of search cost and recall tradeoff is received. At block 708, an optimized tuning vector corresponding to the selected value of the search cost and recall tradeoff is accessed the the LUT. At block 710, the tunable search engine is configured in accordance to the optimized tuning vector corresponding to the selected value of search cost and recall trade off.

What is claimed is:

1. A computer-implemented method for operating a search engine, the method comprising:
generating, by a computing system comprising one or more computing devices, a recall loss function indicating an error metric for the search engine based on a tuning vector and a set of approximate nearest neighbor (ANN) search results that is based on a multi-level set of quantizations of a set of vector embeddings for a set of data objects;
generating, by the computing system, a tradeoff objective function indicating a tradeoff between the error metric and a search cost for the search engine, wherein the tradeoff objective function is based on the recall loss function, a search cost constraint, the tuning vector, and a Lagrange multiplier;
determining, by the computing system, a value for the Lagrange multiplier based on a value for the tradeoff between the error metric and the search cost for the search engine;
determining, by the computing system, values for components of the tuning vector based on the value for the Lagrange multiplier and the tradeoff objective function;
configuring, by the computing system, the search engine based on the values for the components of the tuning vector; and
processing, by the computing system, one or more search queries using the configured search engine in an online mode.

2. The method of claim 1, further comprising:
determining, by the computing system, a set of ground-truth search results based on a set of tuning queries and the set of vector embeddings for the set of data objects; and
generating, by the computing system, the recall loss function further based on the set of ground-truth search results.

3. The method of claim 1, further comprising:
determining, by the computing system, the set of ANN search results are further based on a set of tuning queries.

4. The method of claim 1, wherein processing the one or more search queries comprises:
receiving, by the computing system, a search query, wherein the search query is received from a client of the configured search engine;
determining, by the computing system, a set of search results based on the search query and the configured search engine; and
providing, by the computing system, the set of search results to the client of the configured search engine.

5. The method of claim 1, further comprising:
generating, by the computing system, a set of vector embeddings for the set of data objects; and
generating, by the computing system, the multi-level set of quantizations for the set of vector embeddings based on the set of vector embeddings for the set of data objects.

6. The method of claim 1, wherein the multi-level set of quantizations for the set of vector embeddings includes a set of vector quantization (VQ) layers and a set of product quantization (PQ) layers.

7. The method of claim 1, further comprising:
generating, by the computing system, the set of vector embeddings for the set of objects;
generating, by the computing system, a set of ground-truth search results based on a set of tuning queries and the set of vector embeddings for the set of objects;
generating, by the computing system, the set of ANN search results further based on the set of tuning queries and the multi-level set of quantization of the set of vector embeddings; and
generating, by the computing system, the recall loss function based on the set of ground-truth search results and the set of ANN search results.

8. The method of claim 1, further comprising:
generating, by the computing system, the search cost constraint based on a set of vector embeddings and a quantization index corresponding to the multi-level set of quantizations of the set of vector embeddings for the set of data objects.

9. The method of claim 1, wherein the tradeoff objective function is indicative of a speed-recall Pareto frontier for the tradeoff between the error metric and the search cost for the search engine.

10. The method of claim 1, wherein the search cost for the search engine is based on the multi-level set of quantizations of a set of vector embeddings for a set of data objects.

11. A computing system comprising:
one or more processors; and
one or more non-transitory computer-readable media that store instructions that, when executed by the one or more processors, cause the computing system to perform operations comprising:
generating a recall loss function indicating an error metric for a search engine based on a tuning vector and a set of approximate nearest neighbor (ANN) search results that is based on a multi-level set of quantizations of a set of vector embeddings for a set of data objects;
generating a tradeoff objective function indicating a tradeoff between the error metric and a search cost for the search engine, wherein the tradeoff objective function is based on the recall loss function, a search cost constraint, the tuning vector, and a Lagrange multiplier;
determining a value for the Lagrange multiplier based on a value for the tradeoff between the error metric and the search cost for the search engine;
determining values for components of the tuning vector based on the value for the Lagrange multiplier and the tradeoff objective function;

configuring the search engine based on the values for the components of the tuning vector; and processing one or more search queries using the configured search engine in an online mode.

12. The system of claim 11, the operations further comprising:

determining a set of ground-truth search results based on a set of tuning queries and the set of vector embeddings for the set of data objects; and generating the recall loss function further based on the set of ground-truth search results.

13. The system of claim 11, the operations further comprising:

determining the set of ANN search results that are further based on a set of tuning queries.

14. The system of claim 11, wherein processing the one or more search queries comprises:

receiving a search query, wherein the search query is received from a client of the configured search engine;

determining a set of search results based on the search query and the configured search engine; and providing the set of search results to the client of the configured search engine.

15. The system of claim 11, the operations further comprising:

generating a set of vector embeddings for the set of data objects; and generating the multi-level set of quantizations for the set of vector embeddings based on the set of vector embeddings for the set of data objects.

16. The system of claim 11, wherein the multi-level set of quantizations for the set of vector embeddings includes a set of vector quantization (VQ) layers and a set of product quantization (PQ) layers.

17. The system of claim 11, the operations further comprising:

generating the set of vector embeddings for the set of objects;

generating a set of ground-truth search results based on a set of tuning queries and the set of vector embeddings for the set of objects;

generating the set of ANN search results further based on the set of tuning queries and the multi-level set of quantization of the set of vector embeddings; and generating the recall loss function based on the set of ground-truth search results and the set of ANN search results.

18. The system of claim 11, the operations further comprising:

generating the search cost constraint based on a set of vector embeddings and a quantization index corresponding to the multi-level set of quantizations of the set of vector embeddings for the set of data objects.

19. The system of claim 11, further comprising:

generating the search cost constraint based on a set of vector embeddings and a quantization index corresponding to the multi-level set of quantizations of the set of vector embeddings for the set of data objects.

20. A computing system for processing of search queries, the computing system comprising:

a search engine configured based on a tuning vector, the tuning vector based on an optimization of a tradeoff objective function indicating a tradeoff between an error metric and a search cost for the search engine, wherein:

the tradeoff objective function is based on a recall loss function, a search cost constraint, the tuning vector, and a Lagrange multiplier;

the Lagrange multiplier corresponds to a value for the tradeoff between the error metric and the search cost for the search engine; and the recall loss function computes the error metric for the search engine based on the tuning vector and a set of approximate nearest neighbor (ANN) search results that is based on a multi-level set of quantizations of a set of vector embeddings for a set of data objects;

one or more processors; and one or more non-transitory computer-readable media that store instructions that, when executed by the one or more processors, cause the computing system to perform operations comprising:

inputting, to the search engine in an online mode, a search query;

generating, by the search engine in the online mode, a set of search results based on the search query; and outputting the set of search results.

* * * * *